(12) United States Patent
Wu et al.

(10) Patent No.: US 9,276,459 B2
(45) Date of Patent: Mar. 1, 2016

(54) CONTROL DEVICE FOR USE WITH SWITCHING CONVERTERS

(71) Applicant: Si-En Technology (Xiamen) Limited, Xiamen (CN)

(72) Inventors: Chao Wu, Xiamen (CN); Pengfeng Zheng, Xiamen (CN)

(73) Assignee: Si-En Technology (Xiamen) Limited, Zhen Zhu Wan Software Park, Xiamen Torch Hi-Tech Zone (CN)

( * ) Notice: Subject to any disclaimer, the term of this patent is extended or adjusted under 35 U.S.C. 154(b) by 0 days.

(21) Appl. No.: 14/255,965

(22) Filed: Apr. 18, 2014

(65) Prior Publication Data

US 2014/0355316 A1    Dec. 4, 2014

(30) Foreign Application Priority Data

Apr. 28, 2013 (CN) ...................... 2013 2 0226998 U

(51) Int. Cl.
| | |
|---|---|
| *H02M 1/42* | (2007.01) |
| *H02M 3/335* | (2006.01) |
| *H05B 33/08* | (2006.01) |
| *H02M 1/00* | (2007.01) |

(52) U.S. Cl.
CPC .......... *H02M 1/4258* (2013.01); *H02M 1/4225* (2013.01); *H02M 3/335* (2013.01); *H02M 3/33507* (2013.01); *H02M 3/33523* (2013.01); *H05B 33/0815* (2013.01); *H02M 2001/0022* (2013.01); *Y02B 70/126* (2013.01)

(58) Field of Classification Search
CPC ................... H02M 2001/0022; H02M 1/4258; H02M 1/4225; H02M 3/335; H02M 3/33507; H02M 3/33523
USPC ..................................... 363/21.06, 21.08, 285
See application file for complete search history.

(56) References Cited

U.S. PATENT DOCUMENTS

| | | | | |
|---|---|---|---|---|
| 4,384,321 A | * | 5/1983 | Rippel .......................... | 363/124 |
| 2006/0013026 A1 | * | 1/2006 | Frank et al. ..................... | 363/89 |
| 2009/0147547 A1 | * | 6/2009 | Yamashita ................. | 363/21.16 |
| 2011/0141778 A1 | * | 6/2011 | Wu et al. ......................... | 363/95 |

* cited by examiner

*Primary Examiner* — Timothy J Dole
*Assistant Examiner* — Ishrat Jamali
(74) *Attorney, Agent, or Firm* — Jun He Law Offices P.C.; Zhaohui Wang

(57) ABSTRACT

The present application provides a control device for controlling a switching converting module to generate an output signal of constant output current from a rectified AC power supply signal. The switching converting module comprises a primary winding for receiving the rectified AC power supply signal and a power switch coupled in series with the primary winding. The control device comprises: an AGC amplifier configured to receive a first sampling signal sampled from the rectified AC power supply signal, and to generate a reference signal of constant amplitude according to the first sampling signal; a signal comparator configured to compare the reference signal with a current sensing signal in proportion to a primary side current flowing through the primary side winding to generate a comparison signal; a signal generator configured to receive a second sampling signal sampled from the output signal, and to generate a clock signal according to the second sampling signal; and a control logic configured to generate a control signal for switching the power switch according to the comparison signal and the clock signal.

14 Claims, 3 Drawing Sheets

US 9,276,459 B2

CONTROL DEVICE FOR USE WITH SWITCHING CONVERTERS

FIELD OF THE INVENTION

The present application relates to the switching power supply technology, particularly to a control device for a switching converter, which is suitable for use with a fly-back converter, non-isolating buck-boost converter.

BACKGROUND OF THE INVENTION

The light characteristics of Light Emitting Devices (LEDs) is generally characterized by a function of current rather than a function of voltage because a minor change in the forward voltage of the LED may cause a bigger change in the LED current. As a result, a constant voltage source driver may not ensure the brightness of the LED to be uniform, and may affect the reliability, lifetime and luminous decay of the LED as well. Therefore, the LEDs are generally driven by a constant current source.

In consideration of safety issue, many LED luminaires require the LED driver to have the isolation function, i.e. the electrical isolation between the output of the LED luminaries and the input by the power grid. In mid-low power (less than 150 W) applications, the fly-back converter is the most widely used isolating converter. The most common way of feedback is to implement the feedback control by sampling the LED output with an optical coupler. However, the optical coupler has aging issue, which may affect the stability of the circuit and weaken the electrical isolation.

On the other hand, the wide use of power electronics could cause serious pollution to the utility power grid, and therefore the reactive power draws more and more attention. To reduce the degree of harm caused by the power pollution, many countries have established corresponding standards, which require a high Power Factor (e.g. PF>0.9) when the power exceeds a specific value (e.g. 5 W). Thus, for the higher power LED drivers, the Power Factor Correction (PFC) technology is required to obtain the high PFC. The term high PFC used herein refers to PFC exceeding 0.9.

Currently, almost all the commercially available control methods are based on loop control on traditional switching power supplies. Under different schematics, the control methods vary in algorithm but have a common feature, i.e. the loop compensation is required to achieve a stable system. Furthermore, the loop compensation for different applications such as application having different power or external structures are different. Thus, these control methods are not convenient to apply. FIG. 1 shows the schematic of a conventional PFC constant current control device for the fly-back converter. The key point of the PFC constant current control device is a constant current PFC controller, which is coupled within a driving circuit for the LED load to improve the PFC and implement the constant current control.

As shown in FIG. 1, the driving circuit has a rectifying module, an input capacitor $C_{in}$, a converting module T, voltage sampling network $R_1$ and $R_2$ at the primary side, a rectifying diode $D_1$ at the secondary side, an output capacitor $C_{out}$, an LED load L, and a rectifying diode $D_2$ and voltage sampling network $R_3$ and $R_4$ at the auxiliary side. The constant current PFC controller has a pin for coupling an external compensation capacitor $C_{comp}$. In different applications, the capacitance of the compensation capacitor $C_{comp}$ may be adjusted to achieve the stability of the system. Some other designs may not need the loop compensation by using specific control methods, but such specific control methods makes these designs less compatible.

Besides the difference in the loop compensation, two other ways, one-stage and two-stage control, are commercially available for achieving a constant current system of high PFC. The two-stage control is simple in design but low in efficiency, while the one-stage control is complex in design but high in efficiency.

Thus, there is a need for a control device for a switching converter without loop compensation, which is of high integration and efficiency, low cost and good universality.

SUMMARY OF THE INVENTION

An objective of the present application is to provide a control device for controlling a switching converter without loop compensation. The feedback part of the control device is based on the big signal model instead of the traditional small signal closed loop. Therefore, the control device can automatically stabilize current without the loop compensation and the associated adjustment for loop stability.

In an aspect of the present application, there is disclosed a control device for controlling a switching converting module to generate an output signal of constant output current from a rectified AC power supply signal. The switching converting module comprises a primary winding for receiving the rectified AC power supply signal and a power switch coupled in series with the primary winding The control device comprises: an AGC amplifier configured to receive a first sampling signal sampled from the rectified AC power supply signal, and to generate a reference signal of constant amplitude according to the first sampling signal; a signal comparator configured to compare the reference signal with a current sensing signal in proportion to a primary side current flowing through the primary side winding to generate a comparison signal; a signal generator configured to receive a second sampling signal sampled from the output signal, and to generate a clock signal according to the second sampling signal; and a control logic configured to generate a control signal for turning on or off the power switch according to the comparison signal and the clock signal.

In certain embodiments, the AGC amplifier comprises: a first amplifier having a positive input node for receiving the first sampling signal, a negative input node coupled to ground via a resistor, and an output node coupled to the negative input node via a varistor; a first comparator having a negative input node coupled to the output node of the first amplifier, a positive input node coupled to a first reference voltage, and an output node; a counter having an input node coupled to the output node of the first comparator, and an output node coupled to a control node of the varistor to adjust the resistance of the varistor.

In certain embodiments, the signal generator comprises: a current mirror having an input path for receiving an input current associated with the second sampling signal, and an output path for outputting a mirror current to a capacitor, wherein the capacitor is in parallel with an output switch; a comparator having a positive input node for receiving the voltage across the capacitor, a negative input node for receiving a second reference voltage, and an output node coupled to a control node of the output switch and configured to output the clock signal.

In certain embodiments, the control logic comprises a trigger.

In certain embodiments, the control logic comprises a RS trigger having a reset node coupled to receive the comparison signal, a set node coupled to receive the clock signal, and an output node for outputting the control signal.

In certain embodiments, the control device further comprises: a first voltage divider configured to sample the rectified AC power supply signal to generate the first sampling signal.

In certain embodiments, the switching converting module further comprises an auxiliary winding, the control device further comprises: a second voltage divider configured to sample the output signal via the auxiliary winding to generate the second sampling signal.

In another aspect of the present application, there is disclosed a converter comprising the control device and any one of the aforementioned switching converting module.

In certain embodiments, the switching converting module is a fly-back converting module having a secondary winding for outputting the output signal.

In certain embodiments, the switching converting module is a buck-boost converting module whose primary winding is further configured to output the output signal.

The above described control device without loop compensation according to the present application ensures that the current signal and the voltage signal have a common phase by generating a constant-amplitude signal having the same frequency and phase as the input voltage via the AGC amplifier, thereby to obtain the high PFC. Furthermore, the control device controls the converter to generate a constant output current by using the signal comparator, the control logic and the signal generator and making the signal generator generate a clock signal whose frequency is in proportion to the second sampling signal sampled from the output signal.

Compared with conventional technologies, the control device for use with the switching converting module has the following advantages: 1) a high PFC and constant output current can be obtained without any optical coupler and loop compensation, and the system is stable; 2) the one-stage control method is used, which reduces the external components and saves cost and chip area, thereby to minimize the size of the whole device; 3) the control mechanism of the present application is universal, which can be applied to the fly-back converter and the buck boost converter.

BRIEF DESCRIPTION OF DRAWINGS

The aforementioned features and other features of the application will be further described in the following paragraphs by referring to the accompanying drawings and the appended claims. It will be understood that these accompanying drawings merely illustrate some embodiments in accordance with the present application and should not be considered as limitation to the scope of the present application. Unless otherwise specified, the accompanying drawings need not be proportional, and similar reference characters generally denote similar elements.

DETAILED DESCRIPTION OF THE INVENTION

The following detailed description refers to the accompanying drawings as a part of the present application. The illustrative embodiments described in the detailed description, the accompanying drawings and the claims are not limiting, and other embodiments may be adopted, or modifications may be made without deviating from the spirit and subject of the present application. It should be understood that, the various aspects of the application described and graphically presented herein may be arranged, replaced, combined, divided and designed in many different configurations, and these different configurations are implicitly included in the application.

Figure 1:
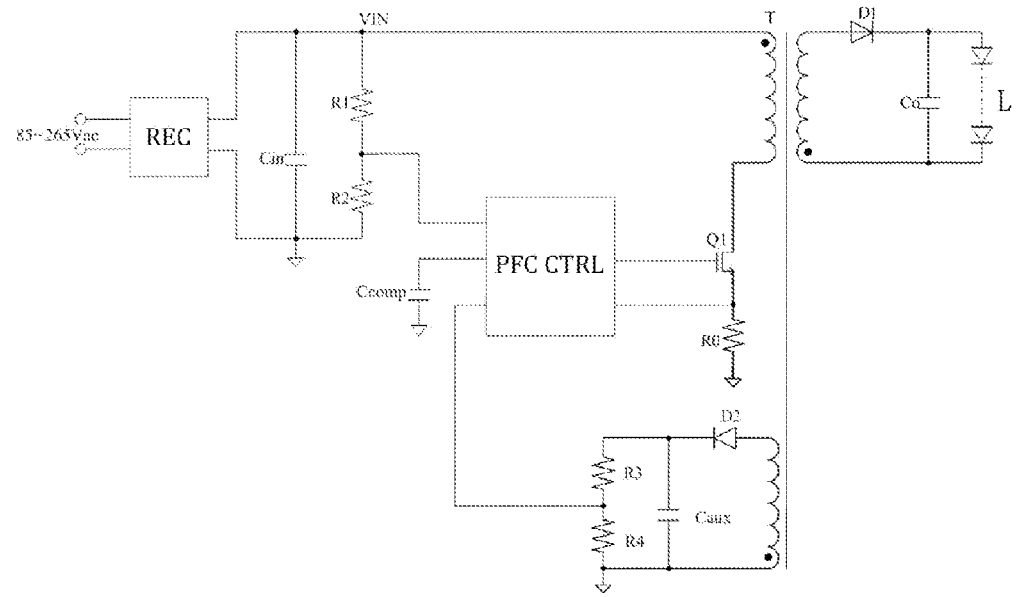
FIG. 1 shows a diagram of a conventional control device for a fly-back converter.
Figure 2:
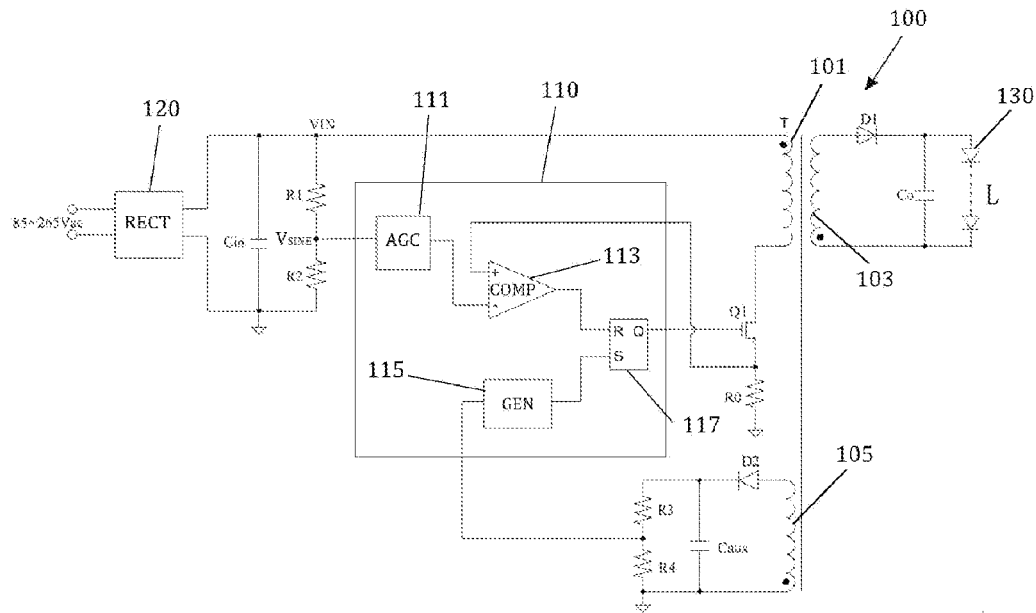
FIG. 2 shows a diagram of a control device for use with a fly-back converter according to an embodiment of the present application.

FIG. 2 shows a diagram of a control device 110 for use with a fly-back converter 100 according to an embodiment of the present application. The fly-back converter 100 is a converting module that receives an input power at its primary winding and outputs an output power at its secondary winding.

The control device 110 is configured to enable the fly-back converter 100 to generate an output signal of constant output current from a rectified AC power supply signal, which is rectified by a rectifying module 120. The fly-back converter 100 comprises a primary winding 101 for receiving the rectified AC power supply signal, a secondary winding 103 for outputting the output signal to a load 130, and an auxiliary winding 105. For example, the load 130 may be a LED device.

The fly-back converter 100 comprises the rectifying module 120, an input capacitor $C_{in}$, a converting module T, a power switch $Q_1$, a primary sensing resistor $R_0$, a primary voltage sampling resistive network $R_1$ and $R_2$, a secondary rectifying diode $D_1$, an output capacitor $C_o$, an auxiliary rectifying diode $D_2$, an auxiliary voltage sampling network $R_3$ and $R_4$ and an auxiliary capacitor $C_{aux}$.

As shown in FIG. 2, the control device 110 comprises an AGC amplifier 111, a signal comparator 113, a signal generator 115 and a control logic 117.

The AGC amplifier 111 is configured to receive a first sampling signal sampled from the rectified AC power supply signal, and to generate a reference signal having constant amplitude according to the first sampling signal.

The signal comparator 113 is configured to compare the reference signal with a current sensing signal in proportion to a primary side current flowing through the primary side winding to generate a comparison signal.

The signal generator 115 is configured to receive a second sampling signal sampled from the output signal, and to generate a clock signal according to the second sampling signal.

The control logic 117 is configured to generate a control signal for switching the power switch according to the comparison signal and the clock signal.

The input node of the AGC amplifier 111 is coupled to the first sampling signal $V_{SINE}$. In the embodiment, the AGC amplifier 111 is coupled to the primary side voltage sampling resistive network. The primary side voltage sampling resistive network constitutes a first voltage divider for sampling the rectified AC power supply signal to generate the first sampling voltage. And the voltage at the input node, i.e. the first sampling signal $V_{SINE}$, is given by the following equation:

$$V_{SINE} = \frac{R_2}{R_1 + R_2} V_{IN} \sin \omega t$$

wherein $$\omega = \frac{2\pi}{10\text{ms}},$$

and $V_{IN}$ ranges from $85\sqrt{2}$ V to $265\sqrt{2}$ V.

Furthermore, $R_1$ and $R_2$ are properly chosen to make $V_{SINE}$ satisfy the following equation:

$$V_{SINE} = V_S \sin \omega t$$

wherein $V_s$ ranges from 0.5V to 1.56V.

The output node of the AGC amplifier 111 outputs the reference signal of constant amplitude. Furthermore, the frequency and phase of the reference signal is the same as those of the first sampling signal $V_{SINE}$.

Figure 3:
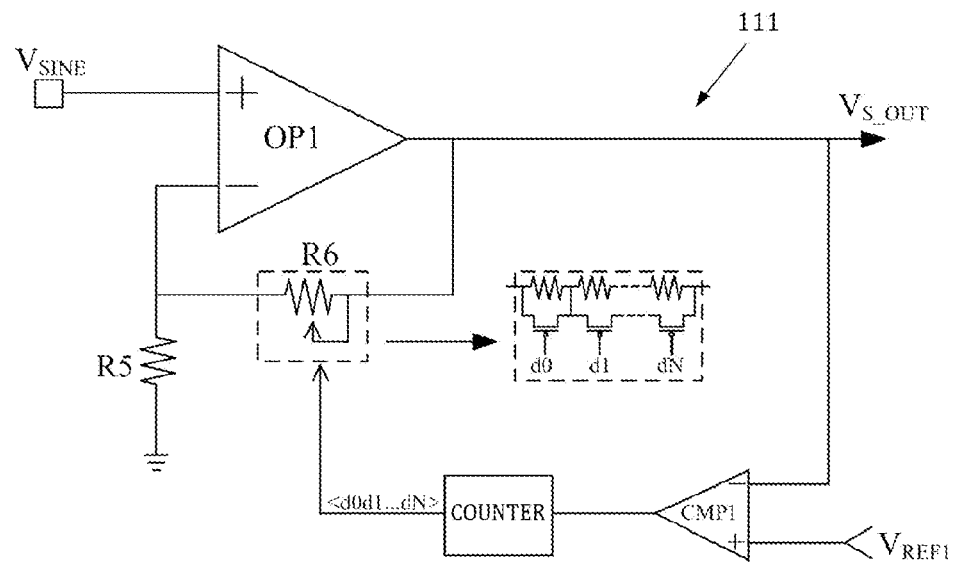
FIG. 3 shows a schematic of an AGC amplifier of the control device shown in FIG. 2.

FIG. 3 shows a schematic of the AGC amplifier of the control device shown in FIG. 2. As shown in FIG. 3, the AGC amplifier 111 has a first amplifier $OP_1$ (e.g. an operational amplifier), a resistor $R_5$, a varistor $R_6$, a counter and a first comparator $CMP_1$. Specifically, the first amplifier $OP_1$ has a positive input node for receiving the first sampling signal, a negative input node coupled to ground via the resistor $R_5$, and an output node coupled to the negative input node via the varistor $R_6$. In the embodiment, the positive input node of the first amplifier $OP_1$ is coupled to the primary voltage sampling network to receive the first sampling signal $V_{SINE}$. The output node of the first amplifier $OP_1$ serves as the output node of the AGC amplifier 111, which outputs the reference signal $V_{s\_out}$. The first comparator $CMP_1$ has a negative input node coupled to the output node of the first amplifier $OP_1$, a positive input node coupled to a first reference voltage $V_{REF1}$, and an output node. The counter has an input node coupled to the output node of the first comparator $CMP_1$, and an output node coupled to a control node of the varistor $R_6$ to adjust the resistance of the varistor $R_6$.

According to the "virtual short circuit" and "virtual open circuit" characteristics of the first operational amplifier $OP_1$, the outputted reference signal $V_{s\_out}$ is given by the following equation:

$$V_{S\_OUT} = \frac{R_5 + R_6}{R_5} V_S$$

In the embodiment, the varistor $R_6$ has variable resistance controlled by a N+1 bit digital signal $d_0 d_1 \ldots d_N$. When $<d_0 d_1 \ldots d_N> = <00 \ldots 0>$, the resistance of the varistor $R_6$ is of minimum value 0. When $<d_0 d_1 \ldots d_N> = <11 \ldots 1>$, the resistance of the varistor $R_6$ is of maximum value. At the initial stage, $R_6$ is equal to 0, the gain of the AGC amplifier 111 is equal to 1. Subsequently, the first comparator $CMP_1$ continuously compares the peak value of the reference signal $V_{s\_out}$ and the first reference voltage $V_{REF1}$ to generate an intermediate control signal to control the operation of the counter. Specifically, when the intermediate control signal outputted by the first comparator $CMP_1$ is at a high level, the counter 211 may add one to the counting result. When the intermediate control signal is at a low level, the counter may stop counting and retain the previous counting result. In this way, the gain of the AGC amplifier may be continuously adjusted by changing the resistance of the varistor $R_6$ to make the peak value of the reference signal $V_{s\_out}$ equal to the first reference voltage $V_{REF1}$, i.e.

$$V_{S\_OUT} = V_{REF1} \sin \omega t$$

Then at the negative input node of the first comparator $CMP_1$, a signal having constant peak value $V_{REF1}$ and whose frequency and phase are the same as those of the first sampling signal can be obtained.

Still referring to FIG. 2, when the power switch Q1 is turned on, the primary side current flowing through the the primary winding 101 continuously increases, and the current sensing signal across the resistor $R_0$ increases accordingly. When the current sensing signal reaches the reference signal, the comparison signal outputted by the signal comparator 113 will change, for example, from "0" to "1". The transition of the comparison signal causes the control signal outputted by the control logic 117 to change accordingly, thereby the power switch Q1 is turned off and no primary side current flows through the primary winding 101. In the embodiment shown in FIG. 2, the control logic 117 is a RS trigger. The RS trigger has a reset node coupled to the output node of the signal comparator 113 to receive the reference signal, a set node coupled to the output node of the signal generator 115 to receive the clock signal, and an output node coupled to the control node of the power switch Q1 to output the control signal. It will be readily appreciated that the control logic 117 may be other suitable triggers, such as the JK trigger.

The signal comparator 113 has a positive input node coupled to the resistor $R_0$, a negative input node coupled to the output node of the AGC amplifier 111, and the output node coupled to the control logic 117.

The signal generator 115 has an input node coupled to the auxiliary voltage sampling network to receive the second sampling signal, which is a DC signal. The auxiliary voltage sampling network constitutes a second voltage divider for sampling the output signal via the auxiliary winding to generate the sampling signal. The signal generator 115 also has an output node coupled to the control logic 117 to output the clock signal whose frequency is in proportional to the amplitude of the second sampling signal.

Figure 4:
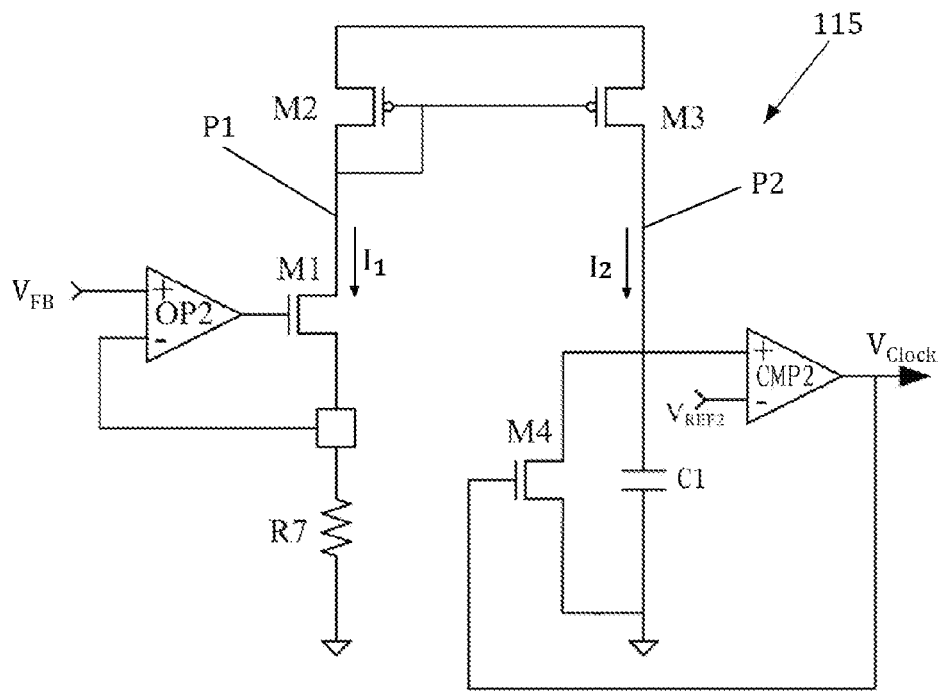
FIG. 4 shows a schematic of a signal generator of the control device shown in FIG. 2.

FIG. 4 shows a schematic of the signal generator of the control device shown in FIG. 2. As shown in FIG. 4, the signal generator 115 has a current mirror having an input path $P_1$ for receiving an input current $I_1$ associated with the second sampling signal $V_{FB}$, and an output path $P_2$ for outputting a mirror current $I_2$ to a capacitor $C_1$, wherein the capacitor $C_1$ is in parallel with an output switch $M_4$. The signal generator 115 further has a second comparator $CMP_2$ with a positive input node for receiving the voltage across the capacitor $C_1$, a negative input node for receiving a second reference voltage $V_{REF2}$, and an output node coupled to a control node of the output switch $M_4$ and configured to output the clock signal $V_{clock}$.

Specifically, the signal generator 115 has a second amplifier $OP_2$ (e.g. an operational amplifier), the second comparator $CMP_2$, a first MOS transistor $M_1$, a second MOS transistor $M_2$, a third MOS transistor $M_3$, a fourth MOS transistor $M_4$, the capacitor $C_1$ and a resistor $R_7$. The positive input node of the second operational amplifier $OP_2$ is coupled to the auxiliary voltage sampling network to receive the second sampling signal $V_{FB}$. The output node of the second operational amplifier $OP_2$ is coupled to the gate of the first MOS transistor $M_1$. The first MOS transistor $M_1$ is further coupled between the negative input node of the second operational amplifier $OP_2$ and a terminal of the resistor $R_7$. The other terminal of the resistor $R_7$ is coupled to the ground. The second MOS transistor $M_2$ and the third MOS transistor $M_3$ constitute the current mirror with a current amplifying ratio of 1:1. The output node of the second comparator $CMP_2$ is configured to output the clock signal $V_{clock}$. The gate of the fourth MOS transistor M4 is coupled to the output node of the second comparator $CMP_2$, the source of the fourth MOS transistor $M_4$ is coupled to the positive input node of the second comparator $CMP_2$, and the drain of the fourth MOS transistor $M_4$ is coupled to the ground. The drain of the third transistor $M_3$ is coupled to the ground via the capacitor $C_1$. The negative input node of the second comparator $CMP_2$ is coupled to the second reference voltage $V_{REF2}$.

Still referring to FIG. 2, the second sampling signal $V_{FB}$ is given by the following equation:

$$V_{FB} = \frac{R_4}{R_3 + R_4}(V_{AUX} - V_{D2})$$

wherein $V_{AUX}$ represents the voltage across the auxiliary winding 105, which is associated with the voltage across the output signal generated by the secondary winding 103. $V_{AUX}$ is given by the following equation:

$$V_{AUX} = \frac{(V_{out} + V_{D1}) \times N_{AUX}}{N_S}$$

wherein $N_S$ denotes the number of turns of the secondary winding 103, $V_{out}$ denotes the output voltage of the output signal outputted by the secondary winding 103, and $N_{AUX}$ denotes the number of turns of the auxiliary winding 105. $V_{D1}$ and $V_{D2}$ denote the voltage drop across the first and second diodes $D_1$ and $D_2$, respectively. The amplitude of $V_{D1}$ and $V_{D2}$ is generally small and may be ignored. Therefore, the second sampling signal $V_{FB}$ may be further given by the following equation:

$$V_{FB} = \frac{R_4}{R_3 + R_4} \times \frac{N_{AUX}}{N_S} \times V_{out}$$

Referring to FIG. 4, the upper terminal of the resistor R7 is set to be equal to the second sampling signal $V_{FB}$. Then the input current $I_1$ flowing through the input path $P_1$ and the output current $I_2$ flowing through the output path $P_2$ is given by the following equation:

$$I_1 = \frac{V_{FB}}{R_7} = I_2$$

Based on the basic charge balance equation CU=It, the frequency of the clock signal is given by:

$$f = \frac{1}{T} = \frac{I_2}{C_1 * U} = \frac{V_{FB}}{V_{REF2} \times R_7 \times C_1} = \frac{1}{V_{REF2} \times R_7 \times C_1} \times \frac{R_4}{R_3 + R_4} \times \frac{N_{AUX}}{N_S} \times V_{out} = K1 \times V_{out}$$

wherein $$K1 = \frac{1}{V_{REF2} \times R_7 \times C_1} \times \frac{R_4}{R_3 + R_4} \times \frac{N_{AUX}}{N_S}$$

The clock signal $V_{Clock}$ is coupled to the set node of the RS trigger 117. When the clock signal is at the high level, the output node Q of the RS trigger 24 will change from "0" to "1" to turn on the power switch Q1.

For the control logic 117 comprised of the RS trigger, its state transition table is listed as below:

| S | R | Q | Clock signal | Comparison signal | Power Switch Q1 |
|---|---|---|---|---|---|
| 1 | 0 | 1 | Rising edge | Low Level | ON |
| 0 | 0 | 1 | Falling edge | Low Level | HOLD |
| 0 | 1 | 0 | Low Level | Rising Edge | OFF |
| 0 | 0 | 0 | Low Level | Falling Edge | HOLD |

Figure 5:
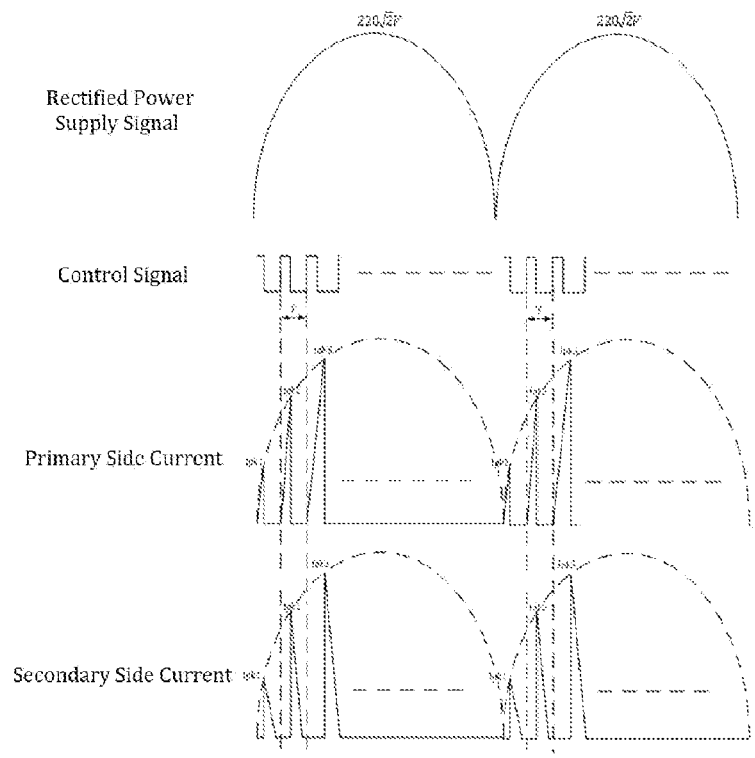
FIG. 5 shows waveforms of a rectified AC power supply signal, a control signal, a primary side current and a secondary side current of the control device shown in FIG. 2.

Based on the above state transition table, the waveforms of the signals of the control device shown in FIG. 2 can be determined, which are shown in FIG. 5.

As shown in FIG. 5, as the operation of the power switch is partially determined by the comparison result of the reference signal and the current sensing signal, the envelope curve for the primary side current is associated with the reference signal. Specifically, when the current sensing signal reaches the reference signal at a specific point, the comparison signal will transit to turn off the primary side current, i.e. the current sensing signal will not exceed the reference signal at any time. As a result, the peaks of the primary side current locate on an envelope curve defined by the quotient of the reference signal divided by the resistance of resistor $R_0$. Consequently, the peaks of the secondary side current also locate on an envelope curve associated with the reference signal.

Also shown in FIG. 5, as the frequency and phase of the envelope curve of the primary side current is the same as those of the rectified power supply signal, the converter is of high PFC. Furthermore, the peak value $i_{pk(n)}$ of the primary side current at any point satisfies the following equation:

$$i_{pk(n)} = i_{pk(max)} \left| \sin\left(2\pi \times \frac{n}{N}\right) \right|$$

wherein N denotes the number of working period T of the converter included in one period of the electricity from power grid, n is a natural number ranging from 1 to N.

The input power $P_{in}$ inputted at the primary side of the converter may be defined as the input energy inputted in a complete sinusoidal period $T_m$ of the electricity from power grid, that is, $$P_{in} = \frac{J_{IN}}{T_m} = \frac{\sum \frac{1}{2} \times L_P \times i_{pk}^2(n)}{T_m} = \frac{L_P}{2T_m} \times i_{pk(max)}^2 \times \Sigma \left|\sin\left(2\pi \times \frac{n}{N}\right)\right|^2 = \frac{L_P}{2T_m} \times i_{pk(max)}^2 \times \frac{1}{2}\Sigma\left(1 - \cos\left(2\pi \times \frac{2n}{N}\right)\right)$$

If N=$T_m$/T, then $P_{in}$ satisfies the following equation:

$$P_{in} = \frac{L_P}{2T_m} \times i_{pk(max)}^2 \times \frac{N}{2} =$$

$$\frac{L_P}{2T_m} \times i_{pk(max)}^2 \times \frac{T_m}{2 \times T} = \frac{L_P \times i_{pk(max)}^2}{4T} = \frac{L_P \times i_{pk(max)}^2 \times f}{4}$$

wherein $L_p$ denotes the equivalent inductance of the primary winding of the fly-back converter, f denotes the working frequency of the control device, and $i_{pk(max)}$ denotes the maximum current flowing through the primary winding in a sinusoidal period, which is equal to $$\frac{V_{REF1}}{R_0}.$$

When the output power $P_{out}$ outputted at the secondary side of the converter is equal to the input power $P_{in}$, then the output power $P_{out}$ will satisfy the following equation:

$$P_{out} = I_{out} \times V_{out} = P_{in} = \frac{1}{4} \times L_p \times i_{pk(max)}^2 \times f$$

then $$I_{out} = \frac{1}{4} \times \frac{L_P \times i_{pk(max)}^2 \times f}{V_{out}} = \frac{1}{4} \times L_p \times \left(\frac{V_{REF1}}{R_0}\right)^2 \times \frac{f}{V_{out}} = K2 \times \frac{f}{V_{out}}$$

Substitute the expression of f into the above equation, then $$I_{out} = K1 \times K2 = \frac{1}{4} \times L_p \times \left(\frac{V_{REF1}}{R_0}\right)^2 \times \frac{1}{V_{REF2} \times R7 \times C_1} \times \frac{R_4}{R_3 + R_4} \times \frac{N_{AUX}}{N_S}$$

wherein $L_p$, $R_0$, $R_7$, $C_1$, $R_3$, $R_4$, $N_{AUX}$, NS are parameters of the external components, which are of constant value; and $V_{REF1}$, $V_{REF2}$, $C_1$ are parameters of the internal components, which are of specific value.

In view of the above, the output current of the converter 100 (i.e. the output current flowing through the secondary winding 103) is of constant value, i.e. the control device controls the converter to generate a constant output current. Moreover, the method for generating the constant output current according to the present application can achieve the high PFC and constant current control without any optical coupling or any type of loop stability compensation.

Figure 6:
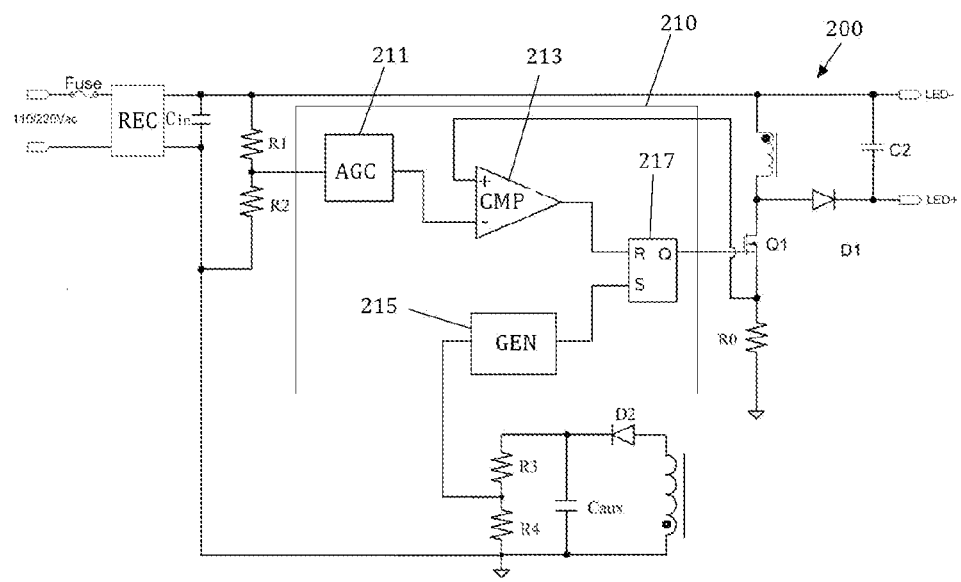
FIG. 6 shows a diagram of a control device for use with a buck-boost converter according to an embodiment of the present application.

The control device according to the present application is simple in structure and has universal applications. Besides the fly-back converter 100, the control device can also be used with the buck-boost converter. FIG. 6 shows a diagram of a control device 210 for a buck-boost converter 200 according to an embodiment of the present application. The buck-boost converter 200 is a converting module that receives an input power and outputs an output power at its primary winding.

As shown in FIG. 6, the control device 210 comprises an AGC amplifier 211, a signal comparator 213, a signal generator 215 and a control logic 217.

Similar to the fly-back converter 100 shown in FIG. 2, the output power of the buck boost converter 200 is fully equivalent to the total power at the primary side. Even under the condition that the current of the inductor is discontinuous, the input power still satisfies the following equation:

$$P_{in} = \frac{1}{4} \times L_p \times i_{pk(max)}^2 \times f$$

When the output power $P_{out}$ outputted by the converter is equal to the input power $P_{in}$, the output power $P_{out}$ will satisfy the following equation:

$$P_{out} = I_{out} \times V_{out} = \frac{1}{4} \times L_p \times i_{pk(max)}^2 \times f$$

then $$I_{out} = \frac{1}{4} \times \frac{L_p \times i_{pk(max)}^2 \times f}{V_{out}} = \frac{1}{4} \times L_p \times \frac{V_{REF1}}{R_0} \times \frac{f}{V_{out}} = K2 \times \frac{f}{V_{out}}$$

Substituting the expression of f into the above equation, then $$I_{out} = K1 \times K3 = \frac{1}{4} \times L_p \times \frac{V_{REF1}}{R_0} \times \frac{1}{V_{REF2} \times R7 \times C1} \times \frac{R_4}{R_3 + R_4}$$

wherein $L_p$, $R_0$, $R_7$, $C_1$, $R_3$ and $R_4$ are parameters of the external components, which are of constant value; and $V_{REF1}$, $V_{REF2}$, $C_1$ are parameters of the internal components, which are of specific value. In view of the above, the output current is of constant value, thereby the control device controls the buck-boost converter to generate the constant output current.

In view of the foregoing, the control device without loop compensation according to the present application ensure that the current signal and the voltage signal have a common phase by generating a constant-amplitude signal having the same frequency and phase as the input voltage via the AGC amplifier, thereby to obtain the high PFC. Furthermore, the control device controls the converter to generate a constant output current by using the signal comparator, the control logic and the signal generator and making the signal generator generate a clock signal whose frequency is in proportion to the second sampling signal sampled from the output signal.

Compared with the conventional technologies, the control device for the switching converting module has the following advantages: 1) a high PFC and constant output current can be obtained without the optical coupler and loop compensation, and the system is stable; 2) the one-stage control method is used, which reduces the external components and saves the cost and chip area, thereby to minimize the size of the whole device; 3) the control mechanism of present application is universal, which can be applied to the fly-back converter, the buck converter and the buck boost converter.

While the present application has been illustrated and described in detail in the drawings and foregoing description, such illustration and description are to be considered illustrative or exemplary and not restrictive; the present application is not limited to the disclosed embodiments. Other variations to the disclosed embodiments can be understood and effected by those skilled in the art in practicing the claimed invention and from the drawings, the disclosure, and the appended claims. In the claims, the word "comprising" does not exclude other elements or steps, and the indefinite article "a" or "an" does not exclude a plural. A single processor or other unit may fulfill the functions of several items recited in the claims. Any reference signs in the claims should not be construed as limiting the scope. The scope and spirit of the application is defined by the appended claims.

What is claimed is:

1. A control device for controlling a switching converting module to generate an output signal of constant output current from a rectified AC power supply signal, the switching converting module comprising a primary winding for receiving the rectified AC power supply signal and a power switch coupled in series with the primary winding, wherein the control device comprises:

an AGC amplifier configured to receive a first sampling signal sampled from the rectified AC power supply signal, and to generate a reference signal of constant amplitude according to the first sampling signal;
a signal comparator configured to compare the reference signal with a current sensing signal in proportion to a primary side current flowing through the primary side winding to generate a comparison signal;
a signal generator configured to receive a second sampling signal sampled from the output signal, and to generate a clock signal according to the second sampling signal; and
a control logic configured to generate a control signal for switching the power switch according to the comparison signal and the clock signal;
wherein the AGC amplifier comprises:
a first amplifier having a positive input node for receiving the first sampling signal, a negative input node coupled to ground via a resistor, and an output node coupled to the negative input node via a varistor;
a first comparator having a negative input node coupled to the output node of the first amplifier, a positive input node coupled to a first reference voltage, and an output node; and
a counter having an input node coupled to the output node of the first comparator, and an output node coupled to a control node of the varistor to adjust the resistance of the varistor.

2. The control device of claim 1, wherein the signal generator comprises:
a current mirror having an input path for receiving an input current associated with the second sampling signal, and an output path for outputting a mirror current to a capacitor, wherein the capacitor is in parallel with an output switch;
a comparator having a positive input node for receiving the voltage across the capacitor, a negative input node for receiving a second reference voltage, and an output node coupled to a control node of the output switch and configured to output the clock signal.

3. The control device of claim 1, wherein the control logic comprises a trigger.

4. The control device of claim 3, wherein the control logic comprises a RS trigger having a reset node coupled to receive the comparison signal, a set node coupled to receive the clock signal, and an output node for outputting the control signal.

5. The control device of claim 1, further comprising:
a first voltage divider configured to sample the rectified AC power supply signal to generate the first sampling signal.

6. The control device of claim 1, wherein the switching converting module further comprises an auxiliary winding, the control device further comprises:
a second voltage divider configured to sample the output signal via the auxiliary winding to generate the second sampling signal.

7. A converter, comprising:
a switching converting module; and
a control device for controlling the switching converting module to generate an output signal of constant output current from a rectified AC power supply signal, the switching converting module comprising a primary winding for receiving the rectified AC power supply signal and a power switch coupled in series with the primary winding, wherein the control device comprises:
an AGC amplifier configured to receive a first sampling signal sampled from the rectified AC power supply signal, and to generate a reference signal of constant amplitude according to the first sampling signal;
a signal comparator configured to compare the reference signal with a current sensing signal in proportion to a primary side current flowing through the primary side winding to generate a comparison signal;
a signal generator configured to receive a second sampling signal sampled from the output signal, and to generate a clock signal according to the second sampling signal; and
a control logic configured to generate a control signal for switching the power switch according to the comparison signal and the clock signal;
wherein the AGC amplifier comprises:
a first amplifier having a positive input node for receiving the first sampling signal, a negative input node coupled to ground via a resistor, and an output node coupled to the negative input node via a varistor;
a first comparator having a negative input node coupled to the output node of the first amplifier, a positive input node coupled to a first reference voltage, and an output node; and
a counter having an input node coupled to the output node of the first comparator, and an output node coupled to a control node of the varistor to adjust the resistance of the varistor.

8. The converter of claim 7, wherein the signal generator comprises:
a current mirror having an input path for receiving an input current associated with the second sampling signal, and an output path for outputting a mirror current to a capacitor, wherein the capacitor is in parallel with an output switch;
a comparator having a positive input node for receiving the voltage across the capacitor, a negative input node for receiving a second reference voltage, and an output node coupled to a control node of the output switch and configured to output the clock signal.

9. The converter of claim 7, wherein the control logic comprises a trigger.

10. The converter of claim 9, wherein the control logic comprises a RS trigger having a reset node coupled to receive the comparison signal, a set node coupled to receive the clock signal, and an output node for outputting the control signal.

11. The converter of claim 7, further comprising:
a first voltage divider configured to sample the rectified AC power supply signal to generate the first sampling signal.

12. The converter of claim 7, wherein the switching converting module further comprises an auxiliary winding, the control device further comprises:
a second voltage divider configured to sample the output signal via the auxiliary winding to generate the second sampling signal.

13. The converter of claim 7, wherein the switching converting module is a fly-back converting module having a secondary winding for outputting the output signal.

14. The converter of claim 7, wherein the switching converting module is a buck-boost converting module whose primary winding is further configured to output the output signal.

* * * * *